Feb. 14, 1933.  P. HOWDEN  1,897,195
CENTRIFUGAL APPARATUS FOR DUST EXTRACTION
Filed June 5, 1930  2 Sheets-Sheet 1

INVENTOR.
Peter Howden
by Monroe E. Miller
Atty.

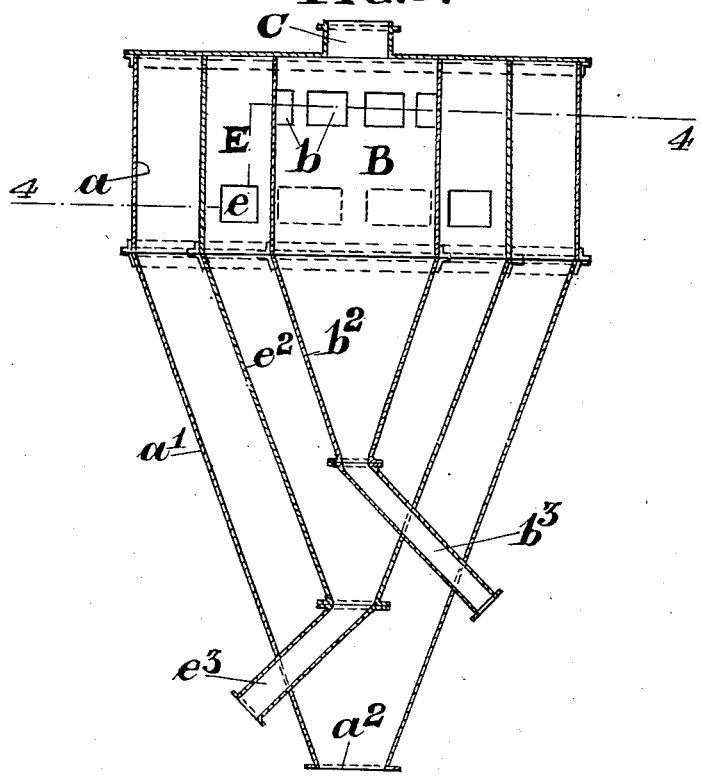
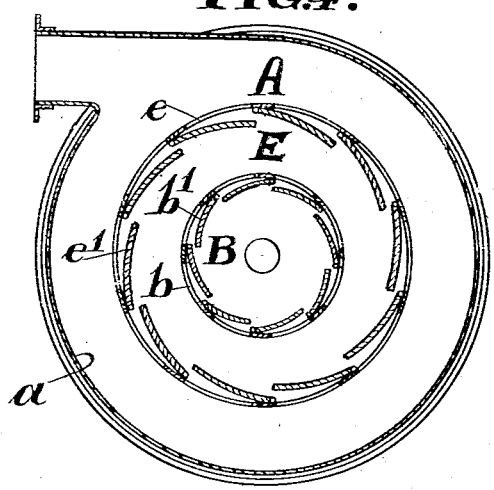

Patented Feb. 14, 1933

1,897,195

UNITED STATES PATENT OFFICE

PETER HOWDEN, OF HALIFAX, ENGLAND, ASSIGNOR TO BRITISH REMA MANUFACTURING CO., LTD., OF HALIFAX, ENGLAND, A CORPORATION OF GREAT BRITAIN

CENTRIFUGAL APPARATUS FOR DUST EXTRACTION

Application filed June 5, 1930, Serial No. 459,309, and in Great Britain July 18, 1929.

This invention relates to dust extraction in which more or less powdered material is carried by an air or other fluid current hereinafter referred to as air through centrifugal apparatus of the cyclone separator type, which separates the finer material hereinafter referred to as dust, from the coarser material, and the present invention has for its chief object to enable superfine dust to be extracted, that is to say dust in which the particles are to all intents uniform in size, and in which no oversize particles occur such as would be detrimental in certain manufactures, for example in the manufacture of paints, gramophone records, and other articles of commerce where a uniformity of fineness is of extreme importance. The invention also has for its object to enable different grades of dust to be extracted in one machine, and which may vary from superfine to coarse, and with all the particles in any one grade of a practically uniform size.

A further object of this invention is to enable air containing dust to be cleaned. In this case the apparatus is suitably proportioned to give maximum extraction effect, and the air made to release the dust entrained therein. If desired the process of grading the dust into several classes of product, say fine, medium, and coarse, may be combined with the process of finally cleaning the air.

According to this invention, dust of a uniform character is obtained by preventing over-size particles which have been separated from the dust laden air in any stage by cyclonic or whirling action from remixing with the dust laden air in its passage to the outlet, or from one stage of the separating process to another, the air being led in a swirling manner from an outer cylindrical chamber through ports in an inner cylindrical chamber or chambers, all of which are extended downwards to form delivery chutes for the particles of material rejected in each successive chamber. The arrangement of the extended portion of such chambers is such that no substantial quantity of air can pass from one chamber to another excepting through the ports in the upper portion. The ports may be fitted with vanes to augment the swirling motion of the air set up primarily by the velocity at which the air enters the first chamber tangentially and such vanes may be adjustable and may be so arranged that the air travels in the same direction of rotation through each successive chamber, or alternatively the vanes may be so arranged as to give different directions of flow in each chamber. It is most important, however, that the air flow is continuously directed towards the centre in its passage from the outside chamber to the inner chamber or chambers and away from the rejected particles of dust which tend to swirl outwardly to the internal periphery of each chamber. By this method most efficient extraction is obtained as the kinetic energy in the dust particles tends to force these in the path of maximum radius whilst the air current is led to the centre of the apparatus in a path diminishing in radius. By this means, once a particle is rejected it is carried by its kinetic energy out of the air stream and has no means of re-entering same.

This invention overcomes the disadvantages of apparatus of similar type wherein an attempt is made to separate the material from the air by resorting to baffle plates or sharp changes of direction of flow or alternating increase and decrease of area of the passages through which the air flows, all of which set up turbulent action or eddies which largely counteract any separating action obtained by such devices. It also overcomes the disadvantages of separators of the cyclone type where an open-ended cylinder is fitted inside another, the air in such apparatus travelling in a downward spiral direction with decreasing swirling motion in the same chamber as the rejected particles thereby allowing re-mixing to take place.

In the accompanying drawings:—

Fig. 3 is a vertical sectional view of a modified form of the invention; and

Fig. 4 is a horizontal sectional view taken on the line 4—4 of Fig. 3.

Figure 1:
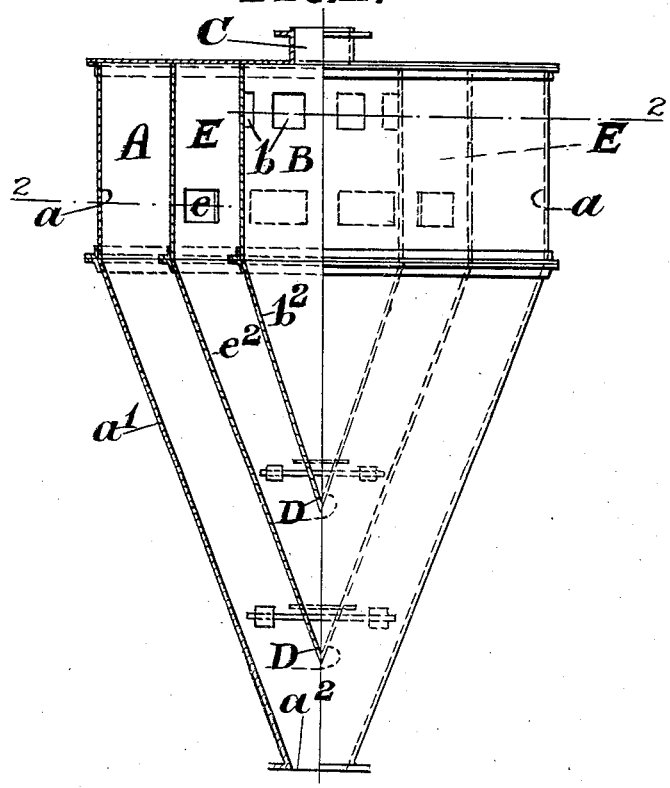
Fig. 1 is a side elevation, partly in section, of an embodiment of the invention.
Figure 2:
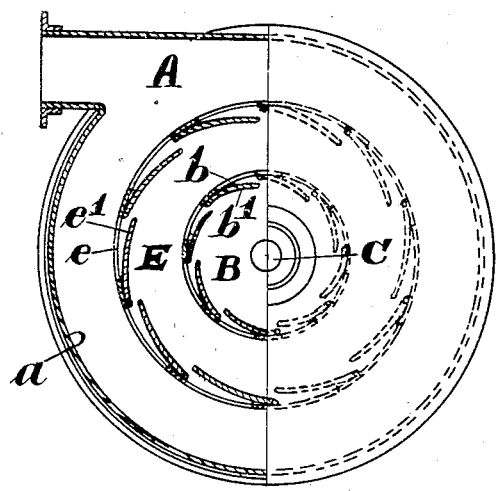
Fig. 2 is a horizontal sectional view taken on the line 2—2 of Fig. 1.

In Figs. 1 and 2, an outer chamber A, an intermediate chamber E and an inner chamber B are employed, the air with the material to be separated entering the outermost chamber A tangentially at or near the top, passing to the next chamber E through ports $e$ which may be provided with pivoted vanes $e^1$, circulating around such intermediate chamber, passing to the next chamber B through ports $b$ provided with pivoted vanes $b^1$ preferably at a higher level than the ports $e$ in the preceding chamber. The air containing the superfine powder ultimately escapes through an axially arranged passage C, the lower end of which is preferably situated above the ports $b$ in the chamber B. The coarser separated materials gravitate downwardly through the conical extensions $a^1$ $e^2$ $b^2$ of their respective chambers and pass to the discharge aperture $a^2$ for collection or retreatment in the manner previously described. The lower ends of the chambers B and E are closed by weighted flaps D.

If the apparatus is to be used for obtaining graded powders as shown in Figs. 3 and 4 the bottom of each conical chamber $e^2$ $b^2$ may lead to a separate collector $e^3$ $b^3$ instead of the bottom of the inner chambers being fitted with weighted flaps or the like to discharge finally into the outer chamber. If it is desired to combine the grading or separating of powders with the action of finally cleaning the air, the apparatus may be the same as that shown in Figs. 3 and 4. If it is desired to use the apparatus for cleaning the air without grading the powders the branch outlets $e^3$ $b^3$ may be omitted and suitable valves, or flaps substituted. Where two sets of vaned ports are used in any application they may deflect air in the same direction as shown in Fig. 2 or in opposite directions as shown in Fig. 4.

The apparatus described may be used by itself or in combination with any existing form of separator and it can be used either alone or in conjunction with pulverizing and grinding apparatus, or other apparatus in which the material to be separated is conveyed by an air current.

Where the apparatus is to be used for cleaning dust laden air, the number of chambers and their proportions are such that even the finest dust is rejected before the air reaches the outlet.

What I claim as my invention and desire to secure by Letters Patent in the United States is:—

1. A separator and grader comprising inner, intermediate and outer cones, vanes at the upper portions of the intermediate and inner cones providing communication with the outer and intermediate cones respectively, the vanes of the intermediate cone being disposed substantially below the vanes in the inner cone, a tangential inlet adjacent the upper end of the outer cone, an axial outlet at the upper end of the inner cone, and outlets for deposited material at the lower ends of each of said cones.

2. An apparatus according to claim 1, and the outlets for deposited material of the inner and intermediate cones comprising angular spouts extending from the bottom thereof outwardly through the wall of the intermediate and outer cone respectively.

In testimony whereof I hereunto affix my signature.

PETER HOWDEN.